United States Patent
Mori et al.

(10) Patent No.: US 6,843,754 B2
(45) Date of Patent: Jan. 18, 2005

(54) CONTROL APPARATUS FOR AN AUTOMATIC TRANSMISSION AND A METHOD FOR CONTROLLING THE SAME

(75) Inventors: Masanori Mori, Kariya (JP); Toshiaki Ishiguro, Chita (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 13 days.

(21) Appl. No.: 10/369,549

(22) Filed: Feb. 21, 2003

(65) Prior Publication Data

US 2003/0186779 A1 Oct. 2, 2003

(30) Foreign Application Priority Data

Feb. 21, 2002 (JP) ........................................ 2002-045200

(51) Int. Cl.[7] .......................... F16H 31/00; B60K 41/20; B60K 41/26
(52) U.S. Cl. .............................. 477/92; 477/94; 477/95; 475/120; 475/127
(58) Field of Search ..................... 477/94, 95; 192/219, 192/219.1; 475/116, 118, 120, 127

(56) References Cited

U.S. PATENT DOCUMENTS

| | | | | |
|---|---|---|---|---|
| 5,630,772 A | * | 5/1997 | Tsukamoto et al. | 477/95 |
| 5,911,646 A | * | 6/1999 | Tsutsui et al. | 477/93 |
| 5,921,884 A | * | 7/1999 | Nishiwaki et al. | 477/61 |
| 6,039,673 A | * | 3/2000 | Mikami et al. | 477/93 |
| 6,411,881 B1 | * | 6/2002 | Thomas | 477/95 |
| 6,645,122 B2 | * | 11/2003 | Ishiguro et al. | 477/97 |

FOREIGN PATENT DOCUMENTS

JP 5-86514 B2 12/1993

* cited by examiner

*Primary Examiner*—Tisha Lewis
(74) *Attorney, Agent, or Firm*—Burns, Doane, Swecker & Mathis, L.L.P.

(57) ABSTRACT

An engagement force for engaging a first friction engagement element is set to be lower than an engagement force for establishing a predetermined shift stage with a second friction engagement element being engaged when a vehicle is stopped with an acceleration pedal not being operated and a brake pedal being operated under a forward driving range in an automatic transmission. The engagement force for the first friction engagement element is increased when a vehicle starts with the brake pedal released from the operated condition, and the engagement force for engaging the second friction engagement element is decreased when a relative rotational speed between a turbine wheel and a forward movement member becomes equal to or smaller than a predetermined rotational speed.

15 Claims, 6 Drawing Sheets

CONTROL APPARATUS FOR AN AUTOMATIC TRANSMISSION AND A METHOD FOR CONTROLLING THE SAME

CROSS REFERENCE TO RELATED APPLICATIONS

This application is based on and claims priority under 35 U.S.C. § 119 with respect to a Japanese Patent Application 2002-045200, filed on Feb. 21, 2002, the entire content of which is incorporated herein by reference.

FIELD OF THE INVENTION

This invention generally relates to a method for controlling an automatic transmission. More particularly, this invention pertains to a method for performing a neutral control for controlling an automatic transmission to be neutral during a vehicle being temporarily stopped and for performing a hill hold control by use of an output shaft reverse rotation restrict mechanism housed in the automatic transmission concurrently with the neutral control.

BACKGROUND OF THE INVENTION

Conventionally, a so-called neutral control is performed so as to control an automatic transmission to be neutral when a vehicle is stopped during a shift lever positioned at a D-range, thereby capable of reducing slip loss of a fluid in a torque converter. However, a vehicle driving force is substantially disappeared when the automatic transmission has been controlled to be neutral so that the vehicle may move in a rearward direction on an uphill slope. In order to prevent the vehicle from moving in the rearward direction during the neutral control, a hill hold control has been highly valued, which is performed by use of an output shaft reverse rotation restrict mechanism housed in the automatic transmission.

The forgoing type of control is disclosed in a Japanese Patent Publication published as Toku-Kou-Hei 5(1993)-86514. An automatic transmission disclosed in the aforementioned publication is provided with a forward clutch, which connects a torque converter and the transmission, a one-way clutch, which cooperates with the forward clutch and establishes a forward shift stage when being engaged, and a shift brake, which cooperates with the one-way clutch and prevents a vehicle from moving in a rearward direction when being engaged. While the vehicle has been temporarily stopped with a vehicle brake-operating member being operated, an engaging pressure applied to the forward clutch is set to be substantially lower than an engaging pressure actually applied to the forward clutch during the forward shift stage being established in the automatic transmission and the shift brake is also engaged. Corresponding to release of the vehicle brake operating member from the operated condition, the engaging pressure, which has been applied to the forward clutch under the above-described circumstances, is increased up to a level of the engaging pressure actually applied to the forward clutch under the forward shift stage. The shift brake is released from the engaged condition in a period of time after the initial increase of the engaging pressure applied to the forward clutch. The period of time is prescribed in accordance with the increase of the engaging pressure applied to the forward clutch.

According to the automatic transmission described above, the shift brake is released from the engaged condition in the predetermined period of time. Therefore, the shift brake may be released from the engaged condition before the forward clutch is engaged due to dimensional fluctuation of the forward clutch or the shift brake or due to fluctuation of the controlled oil pressure, thereby the hill hold condition may be released before the neutral shift stage is shifted to the forward shift stage. In this case, the one-way clutch may not be able to effectively prevent the vehicle from moving in the rearward direction and the vehicle may move in the rearward direction so that a driver may obtain an uncomfortable start feeling.

Accordingly, the present invention therefore seeks to provide an automatic transmission, in which neutral and hill hold controls are performed during a vehicle being stopped so as to achieve a preferable start feeling.

SUMMARY OF THE INVENTION

According to an aspect of the present invention, a control apparatus for controlling an automatic transmission for a vehicle includes an automatic transmission capable of switching plural shift stages, a torque converter; capable of transmitting rotation of an engine to the automatic transmission via a fluid, a first friction engagement element for connecting a turbine wheel housed in the torque converter and a forward movement member housed in the automatic transmission when the first friction engagement element is engaged, a one-way clutch housed in the automatic transmission so as to establish a predetermined shift stage in the automatic transmission cooperating with the first friction engagement element, and a second friction engagement element housed in the one-way clutch when being engaged.

An engagement force for engaging the first friction engagement element is set to be lower than an engagement element being engaged when a vehicle is under a stationary condition with an acceleration operating member not being operated and a brake operating member being operated under a forward driving range being established in the automatic transmission. The engagement force for engaging the first friction engagement element is increased when the vehicle starts from the stationary condition with the brake operating member released from the operated condition. The engagement force for engaging the second friction engagement element is decreased when a relative rotational speed between the turbine wheel and the forward movement member become substantially equal to or smaller than a predetermined rotational speed. Accordingly, the predetermined shift stage is established in the automatic transmission.

According to another aspect of the present invention, the engagement force for engaging the second friction engagement element is decreased at a predetermined rate when the relative rotational speed becomes substantially equal to or smaller than an intermediate rotational speed which is greater than the predetermined rotational speed in response to the vehicle start from the operated condition and the engaging force for engaging the second friction engagement element is further decreased faster than the predetermined rate when the relative rotational speed becomes substantially equal to or smaller than the predetermined rotational speed.

According to further another aspect of the present invention, the predetermined rate is varied so as to decrease the engagement force for engaging the second friction engagement element corresponding to a variation of the relative rotational speed when the relative rotational speed is within a range between the intermediate rotational speed and the predetermined rotational speed.

BRIEF DESCRIPTION OF THE DRAWING FIGURES

The foregoing and additional features and characteristics of the present invention will become more apparent from the following detailed description considered with reference to the accompanying drawing figures wherein.

Figure 3:
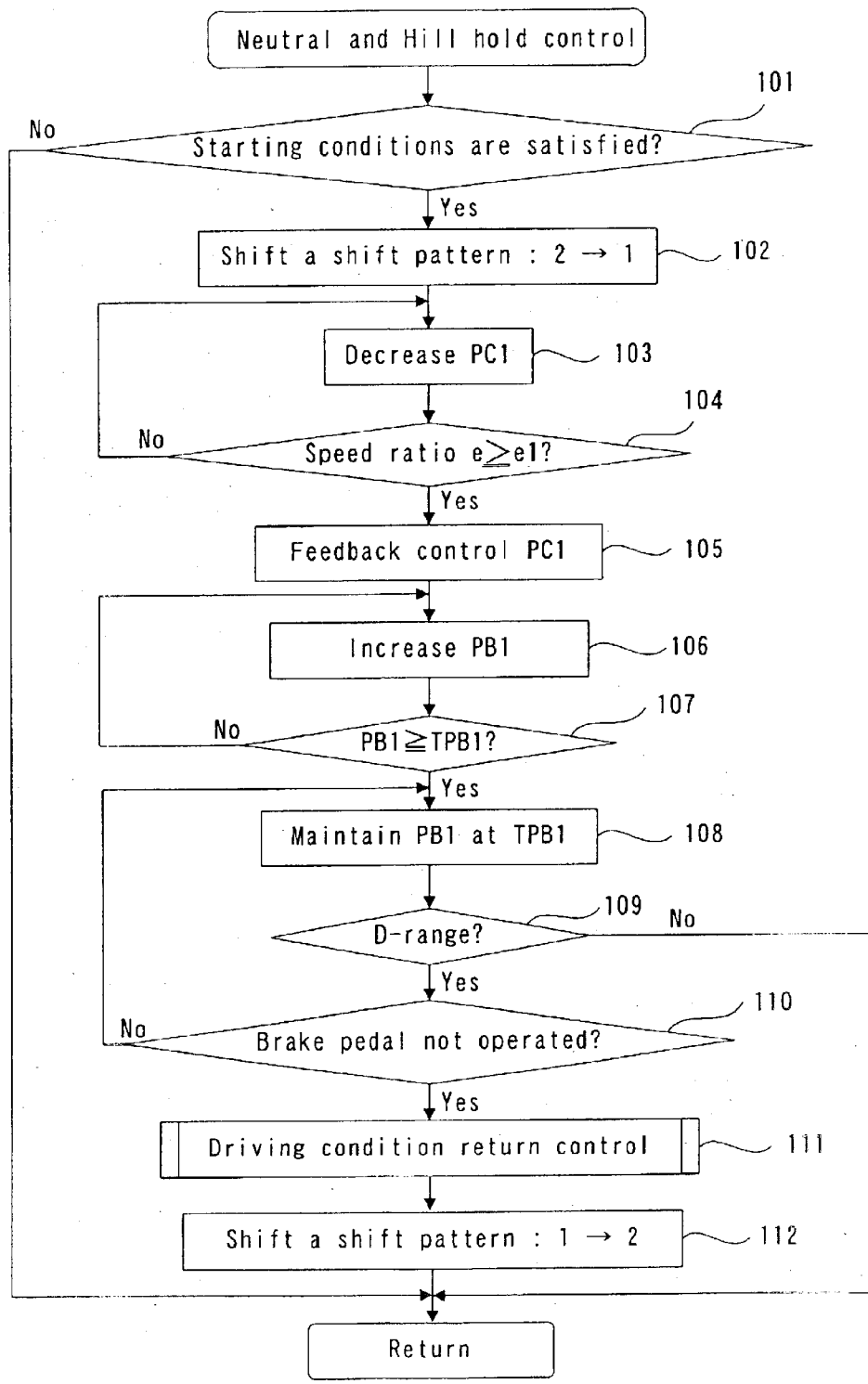
FIG. 3 is a flow chart for explaining a series of process of each neutral and hill hold control according to the embodiments of the present invention.
Figure 5:
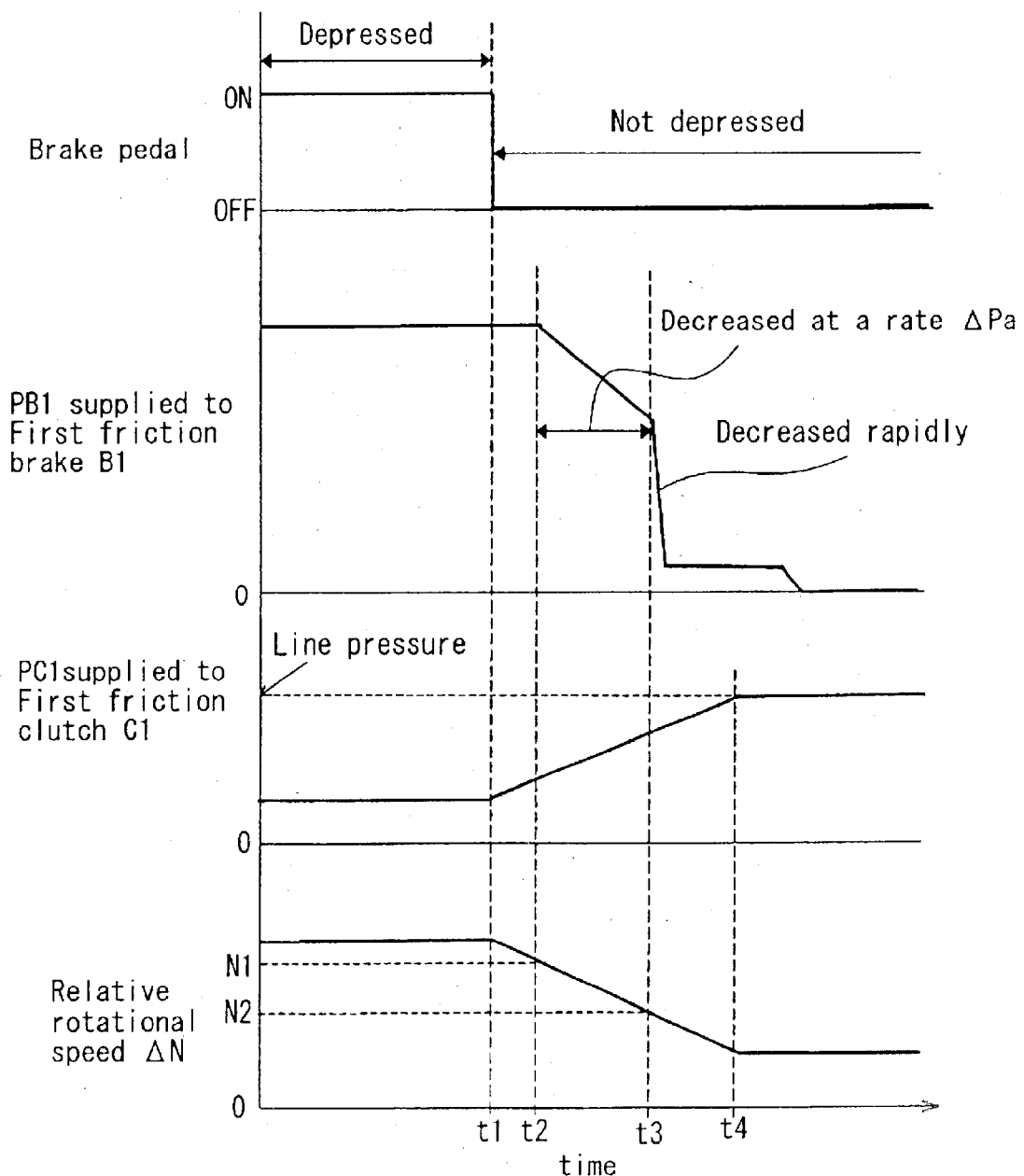
Figure 6:
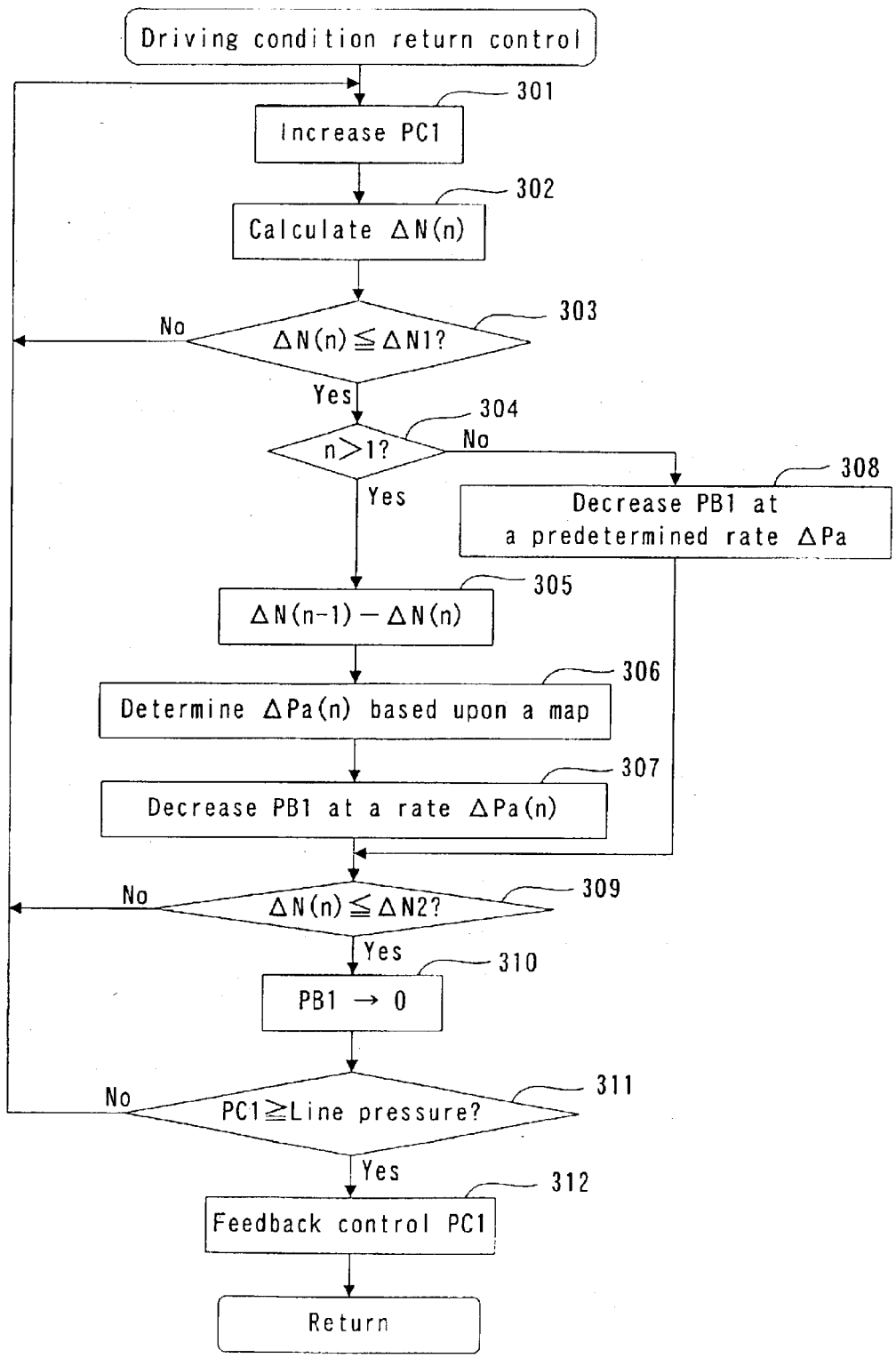

FIG. 5 is a time chart illustrating an operated condition of a brake pedal during the driving condition return control, an oil pressure supplied to a first friction brake, an oil pressure supplied to a first friction clutch, and a relative rotational speed between a turbine wheel housed in a torque converter and a forward moving member housed in the automatic transmission; and FIG. 6 is a flow chart for explaining a control for returning to the driving condition performed at step 111 in the flow chart of FIG. 3 according to the second embodiments of the present invention.

DETAILED DESCRIPTION OF THE INVENTION

Figure 1:
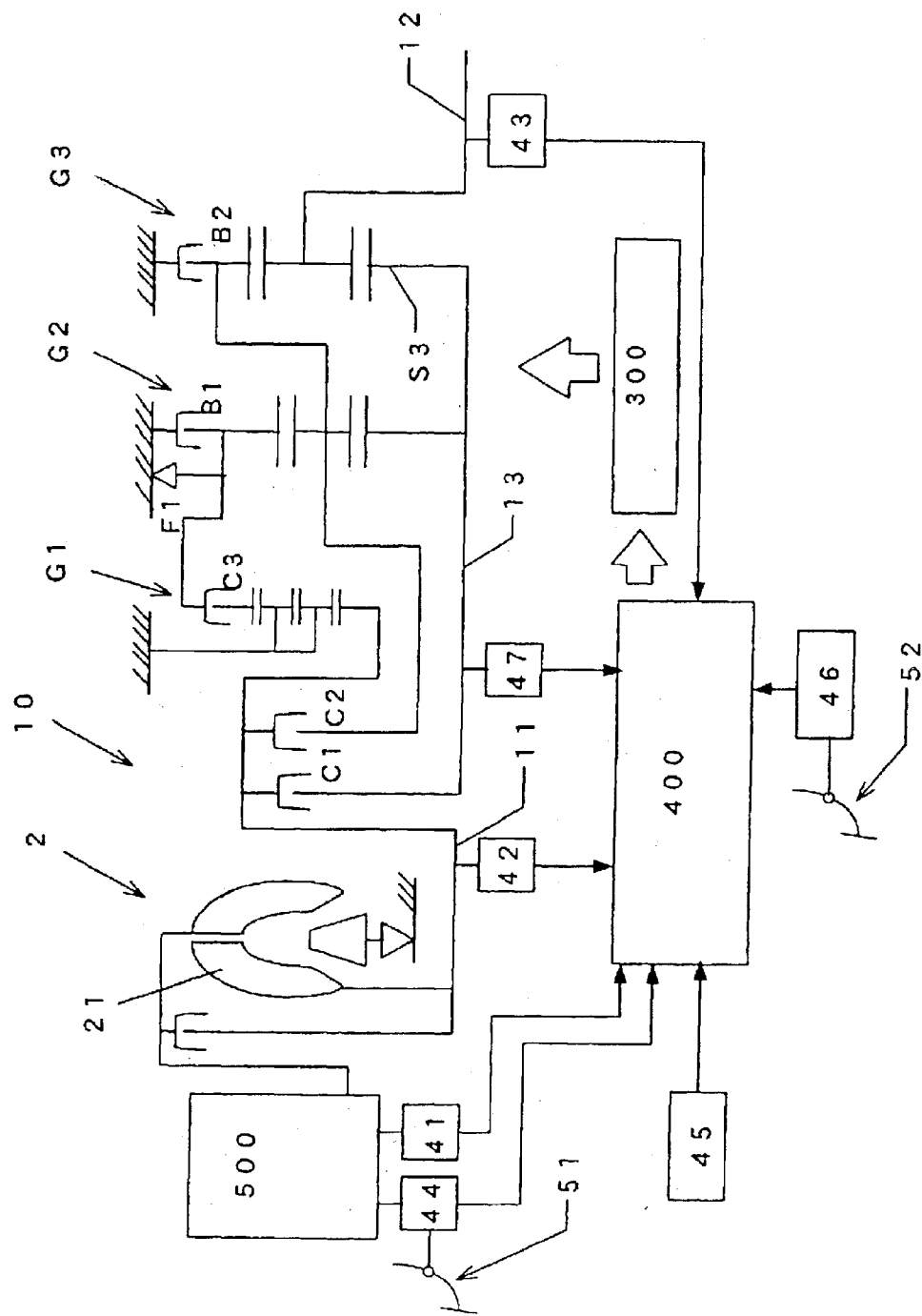
FIG. 1 is a block view schematically illustrating an entire structure of a control apparatus for controlling an automatic transmission according to embodiments of the present invention.

Referring to FIG. 1, a crank shaft (not shown) of an engine 500 is connected to a torque converter 2 having a turbine wheel 21. The turbine wheel 21 is connected to an automatic transmission 10 provided with hydraulically driven five friction engagement elements (described later). As especially seen in FIG. 2, an oil pressure control unit 300 controls an oil pressure supplied to the five friction engagement elements and discharged therefrom. Operation of plural solenoid valves (described later) in the oil pressure control unit 300 is controlled by an electronic control unit (an ECU) 400.

The automatic transmission 10 is further provided with an input shaft 11, which rotates integrally with the turbine wheel 21, an output shaft 12, which is operatively connected to an axle shaft via a differential gear (not shown), a first double pinion planetary gear G1 having a sun gear connected to the input shaft 11, a second single pinion planetary gear G2, a third single pinion planetary gear G3, the foregoing five friction engagement elements such as a first friction clutch C1, a second friction clutch C2, a third friction clutch C3, a first friction brake B1, and a second friction brake B2, a one-way clutch F1, and a forward movement member 13 which can be connected to the input shaft 11 via the first friction clutch C1 or the second friction clutch C2. When the forward movement member 13 is connected to the input shaft 11, a forward shift stage can be established. The automatic transmission 10 according to embodiments of the present invention is structured to perform six forward shift stages and a single reverse shift stage by controlling the oil pressure supplied to the five friction engagement elements by the oil pressure control unit 300 and the ECU 400. A first shift stage can be established in the automatic transmission 10 when the first friction clutch C1 (a first friction engagement element) is engaged cooperatively with the one-way clutch F1. A reverse rotation of the output shaft 12 of the transmission 10 can be prevented when the first friction brake B1 (a second friction engagement element) is engaged cooperatively with the one-way clutch F1.

Figure 2:
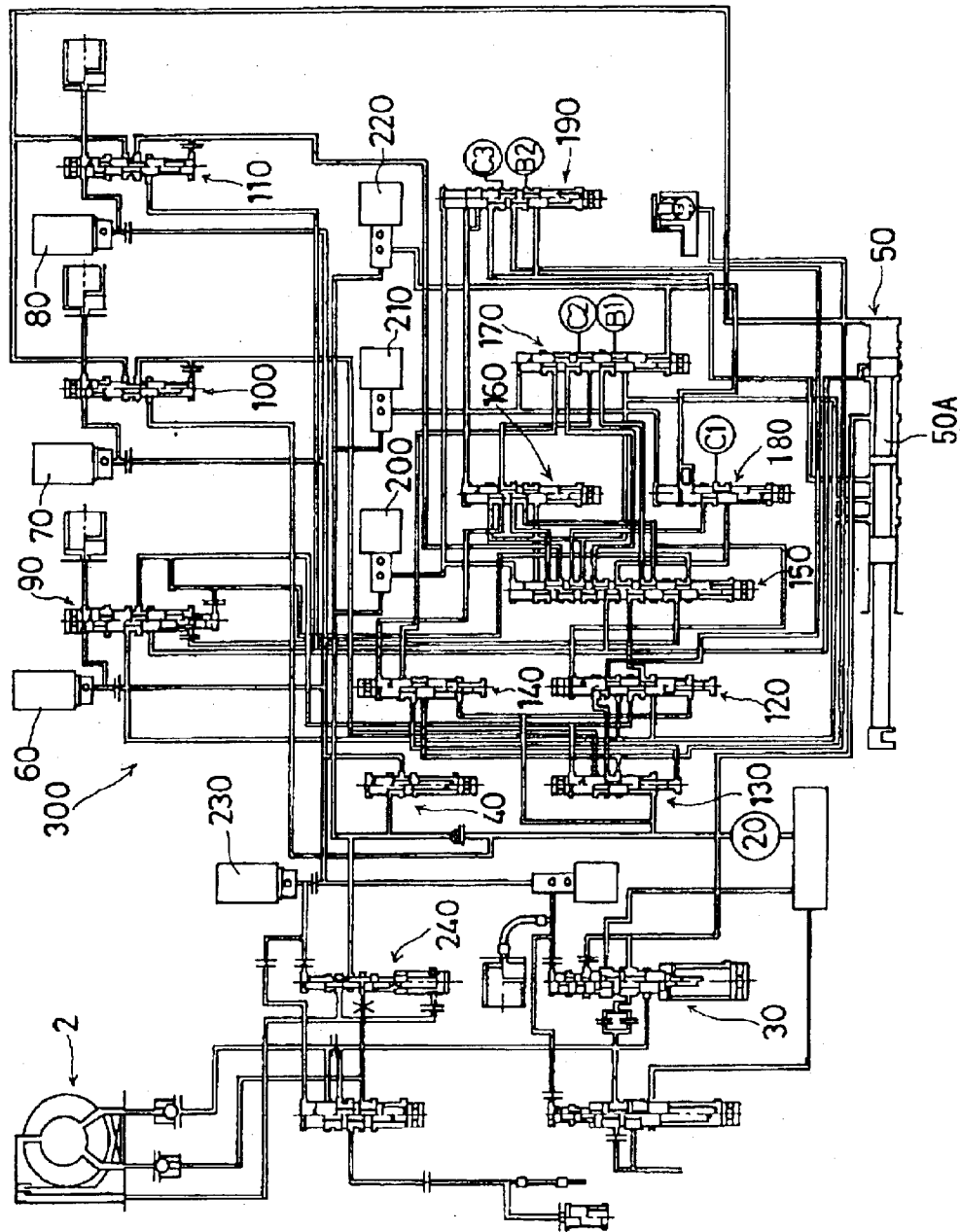
FIG. 2 is an oil pressure circuit diagram for the automatic transmission according to the embodiments of the present invention.

As especially seen in FIG. 2, the oil pressure control united 300 is provided with an oil pump 20, a regulator valve 30 for generating a line pressure, a modulator valve 40 for decreasing the line pressure, a manual valve 50 for shifting the driving range of the automatic transmission 10 in response to operation of a manual shift lever (not shown), linear solenoid valves 60, 70, and 80 which uses the oil pressure directly supplied from the oil pump 20 and the oil pressure supplied from the oil pump 20 via the regulator valve 30 and consecutively generate regulated oil pressure corresponding to electric current supplied thereto, control valves 90, 100, and 110, which introduce the regulated oil pressure outputted from the linear solenoid valves 60, 70, and 80 and generate control oil pressure corresponding to the regulated oil pressure introduced thereto, three fail valves 120, 130, and 140, which introduce the control oil pressure outputted respectively from the control valves 90, 100, and 110 so as to prevent the friction engagement elements from being double engaged, five shift valves 150, 160, 170, 180, and 190, which introduce the control oil pressure outputted from the control valve 90, 100, and 110 via the fail valves 120, 130, and 140 and shift supplying/discharging of the control oil pressure to the respective friction engagement elements in response to a position of each shift valve, and ON-OFF solenoid valves 200, 210, and 220, which intermittently switches the position of each shift valve 150, 160, 170, 180, and 190 in response to electric current supplied thereto.

The manual valve 50 is a spool valve provided with a spool 50A axially operated in response to the operation of the manual shift lever. The manual valve 50 employs the spool 50A for performing a shift operation among seven ranges such as a P-range designating a parking range, an R-range designating a reverse driving range, a N-range designating a neutral range, a D-range designating a forward driving range, a 3rd-range, a 2nd-range, and an L-range designating a low driving range. Therefore, the manual valve 50 establishes or interrupts the communication between the oil pump 20 and the control valve, and the oil pump 20 and the shift valve. A following Table 1 shows a relationship between each range established in the transmission 10 and an engagement/disengagement of each friction engagement element.

TABLE 1

| | | C1 | C2 | C3 | B1 | B2 | F1 |
|---|---|---|---|---|---|---|---|
| R | | | | ○ | | ○ | |
| P | | | | | | | |
| N | | | | | | ○ | |
| D | 1 | ○ | | | | | ○ |
| | 2 | ○ | | | ○ | | |
| | 3 | ○ | | ○ | | | |
| | 4 | ○ | ○ | | | | |
| | 5 | | ○ | ○ | | | |
| | 6 | | ○ | | | ○ | |
| 3 | 1 | ○ | | | | | ○ |
| | 2 | ○ | | | ○ | | |
| | 3 | ○ | | ○ | | | |
| 2 | 1 | ○ | | | | | ○ |
| | 2 | ○ | | | ○ | | |
| L | 1 | ○ | | | | ○ | |
| | ○ | | | | engaged | | |
| blank | | | | | disengaged | | |

The ECU 400 can control the control oil pressure supplied to each friction engagement element only by controlling an electrically exciting operation for the linear solenoid valves 60, 70, and 80 without switching the electrically excited condition of the ON-OFF solenoid valves 200, 210, and 220, thereby determining plural shift patterns for establishing an intended shift stage in the automatic transmission 10. According to the embodiments of the present invention, the ECU 400 can determine seven shift patterns from a shift pattern 1 through a shift pattern 7 in accordance with combinations of electrically excited/de-excited ON-OFF solenoid valves 200, 210, and 220.

The engagement force for engaging each friction engagement element substantially proportionally corresponds to the control oil pressure supplied thereto. The engagement force is increased corresponding to the increase of the supplied control oil pressure. When the control oil pressure is not supplied to each friction engagement element, the engagement force can not be generated. According to the embodiments of the present invention, the control oil pressure is supplied to each friction engagement element as described hereinbelow. When each linear solenoid valve 60, 70, and 80 is not electrically excited, the regulated oil pressure reaches a maximum pressure level. The regulated oil pressure is decreased in response to the increase of the electric current supplied to each linear solenoid valve and can not be supplied to each control valve 90, 100, and 110 when the maximum electric current is supplied thereto. That is, when each linear solenoid valve 60, 70, and 80 is not electrically excited, the maximum control oil pressure is outputted from each control valve 90, 100, and 110. On the other hand, when each linear solenoid valve is electrically excited, the control oil pressure outputted from each control valve is decreased in response to the increase of the electric current supplied thereto, thereby the control oil pressure can not be generated when the maximum electric current is supplied to each linear solenoid valve. The ON-OFF solenoid valve 200 is a normally open type valve which supplies the control oil pressure to the shift valve during being electrically de-excited and does not supply during being electrically excited. The ON-OFF solenoid valves 210 and 220 are normally closed-type valves which supply the control oil pressure to the shift valve during being electrically excited and does not supply during being electrically de-excited.

As described above, the control oil pressure outputted from each control valve 90, 100, and 110 is supplied to an intended friction engagement element in accordance with the valve position switching operation of each shift valve 150, 160, 170, 180, and 190 in response to the electric current supplied to each ON-OFF solenoid valve 200, 210, and 220, thereby controlling the engagement force for engaging each friction engagement element. The oil pressure control unit 300 is further provided with a linear solenoid valve 230 which generates a regulated oil pressure supplied to a lock-up control valve 240 so as to control operation of a lock-up clutch (not shown) of the torque converter 2.

The electronic control unit 400 is provided with a microcomputer (not shown) and is connected to an engine rotational speed sensor 41 for detecting a rotational speed of the crank shaft of the engine 500, an input shaft rotation speed sensor 42 for detecting a rotational speed of the input shaft 11 of the transmission 10, an output shaft rotational speed sensor 43 for detecting a rotational speed of the output shaft 12 of the transmission 10, an acceleration opening degree sensor 44 for detecting a depressing amount of an accelerator pedal 51 (an acceleration operating member) corresponding to an opening degree of a throttle valve (not shown) of the engine 500, a position sensor 45 for detecting an actual range determined by the manual shift lever operated by a driver, a brake sensor 46 for detecting a depressing amount of a brake pedal 52 (a brake operating member) by the driver, and a forward movement member rotational speed sensor 47 for detecting a rotational speed of the forward movement member 13. The ECU 400 controls the electric current to be supplied to each linear solenoid valve 60, 70, and 80 and each ON-OFF solenoid valve 200, 210, and 220 based upon the outputs from the above-described sensors so as to establish an intended shift stage in the transmission 10.

TABLE 2

| Shift | ON/OFF S/V | | | Friction Engagement Element | | | | | Established Shift Stage | | | | | | |
|---|---|---|---|---|---|---|---|---|---|---|---|---|---|---|---|
| Pattern | 200 | 210 | 220 | C1 | C2 | C3 | B1 | B2 | N | 1 | 2 | 3 | 4 | 5 | 6 |
| 1 | ○ | X | X | 3 | | | 1 | 2 | ☆ | * | * | | | | |
| 2 | ○ | X | ○ | ⊙ | | | 1 | 2 | | ☆ | ☆ | | | | |
| 3 | ○ | ○ | ○ | ⊙ | | 2 | 1 | | | | * | ☆ | | | |
| 4 | ○ | ○ | X | ⊙ | | 2 | | | | | | * | | | |
| 5 | X | ○ | X | 1 | 3 | 2 | | | | | | * | ☆ | ☆ | |
| 6 | X | ○ | ○ | 1 | ⊙ | 2 | | | | | | | * | * | |
| 7 | X | X | ○ | 1 | ⊙ | 2 | 3 | | | | | | * | * | ☆ |

ON-OFF S/V
○ electrically excited
X electrically de-excited
Friction Engagement Element
1 controlled by a linear solenoid valve 60
2 controlled by a linear solenoid valve 70
3 controlled by a linear solenoid valve 80
⊙ controlled by a line pressure
出力可能変速段
☆ a shift stage when running at a constant state
*a shift stage when a shifting operation is performed Table 2 shows whether or not each ON-OFF solenoid valve 200, 210, and 220 has been electrically excited in accordance with each shift pattern determined by the ECU 400, which friction engagement element can be supplied with the control oil pressure from each control valve 90, 100 and 110 in accordance with each shift pattern, and which shift stage can be established in the transmission 10 in accordance with each shift pattern. There are at least a shift stage, which can be established in accordance with each shift pattern when running at a constant state and a shift stage, which can be shifted to upon the shifting operation in the automatic transmission 10.

Hereinafter, operation of the automatic transmission 10 according to the embodiments of the present invention is described here in below so as to perform a neutral control and a hill hold control.

When a forward first shift stage of the D-range has been established in the transmission 10 before the neutral control is started, only the first friction clutch C1 is supplied with the line pressure so as to be engaged and the other friction engagement elements are not engaged. The rotation of the engine 500 can be hence transmitted to the input shaft 11 via the torque converter 2 so that the input shaft 11 can be rotated. The rotation of the input shaft 11 is transmitted to a sun gear S3 of the third single pinion planetary gear G3 via the first friction clutch C1 and is then transmitted to the output shaft 12. When the brake pedal 52 is operated and the vehicle is stopped under the above-described circumstances, the rotation of the output shaft 12 is substantially terminated and the neutral control and the hill hold control are satisfied, the first friction clutch C1 is disengaged and the rotation of the input shaft 11 is not transmitted to the output shaft 12 anymore, wherein the torque converter 2 is disconnected from the transmission 10. Accordingly, a neutral condition is established in the automatic transmission 10. Afterwards, the first friction brake B1 is engaged cooperating with the one-way clutch F1 so as to prevent the output shaft 12 from being rotated in the reverse direction. Accordingly, a hill hold condition is established in the automatic transmission 10.

Next, a method for controlling the automatic transmission 10 according to the embodiments of the present invention is described hereinbelow with reference to flow charts and a line chart in FIGS. 3 through 6.

As explained in FIG. 3, the ECU 400 judges at step 101 whether or not the conditions for starting the neutral control and the hill hold control have been satisfied. The neutral and hill hold controls can be started when all the following conditions are satisfied at one time; the position sensor 45 detects that the manual shift lever is positioned at the driving range such as the D-range, the 3rd-range, the 2nd-range, or the L-range, the output shaft rotational speed sensor 43 detects zero, the acceleration opening degree sensor 44 detects zero, and the brake sensor 46 detects the brake pedal 52 being operated. The vehicle travels at a low speed immediately before the staring conditions are satisfied so that the first shift stage is established in the transmission 10 in accordance with the shift pattern 2, as shown in TABLE 2. When the ECU 400 judges at step 101 that the starting conditions have been satisfied, the program proceeds to step 102 so as to shift the shift pattern 2 to the shift pattern 1 by electrically de-exciting the ON-OFF solenoid valve 220, thereby establishing the neutral condition. The first friction clutch C1 is then supplied to the regulated oil pressure which had been supplied to the first clutch C1 as an oil pressure PC1. The linear solenoid valve 80 is electrically excited for generating the oil pressure, which is substantially equal to the line pressure, so as not to rapidly change the oil pressure PC1 in accordance with the shift operation from the shift pattern 2 to the shift pattern 1.

The program proceeds to step 103 for decreasing the oil pressure PC1 at a constant rate by controlling the electrically exciting operation for linear solenoid valve 80 so as to establish the neutral condition. At step 104, the ECU 400 judges whether or not a speed ratio e of the torque converter 2 is substantially equal to or greater than a predetermined speed ratio e1. The speed ratio e represents a ratio between the RPM of the engine 500 detected by the engine rotational speed sensor 41 and the RPM of the input shaft 11 detected by the input shaft rotational speed sensor 42. That is, the ECU 400 judges at step 104 whether or not the torque converter 2 was disconnected from the transmission 10 with the sufficiently decreased oil pressure PC1 supplied to the first friction clutch C1 and judges whether or not the actual shift stage in the transmission 10 was shifted to the neutral shift stage. When the ECU 400 judges at step 104 that the speed ratio e is smaller than the predetermined speed ratio e1, the program returns to step 103 so as to decrease the oil pressure PC1 at the constant rate and to control the speed ratio e to be substantially equal to or greater than the predetermined speed ratio e1 . On the other hand, when the ECU 400 judges at step 104 that the speed ratio e is substantially equal to or great than the predetermined speed ratio e1, the program proceeds to step 105 so as to feedback control the oil pressure PC1, thereby the speed ratio e is maintained speed ratio e1.

At step 106, an oil pressure PB1 to be supplied to the friction brake B1 is increased at a constant rate by controlling an electrically exciting operation for the linear solenoid valve 60. The ECU 400 then judges at step 107 whether or not the oil pressure PB1 supplied to the first friction brake B1 has reached a predetermined oil pressure TPB1. When the ECU 400 judges at step 107 that the oil pressure PB1 is still smaller than the predetermined oil pressure TPB1, the program returns to step 106 so as to increase the oil pressure PB1 up to the predetermined oil pressure TPB1. The program further proceeds to step 108, wherein the oil pressure PB1 is controlled to be maintained at the predetermined oil pressure TPB1. In this case, the engagement force for engaging the first friction clutch C1 is sufficiently decreased in response to the sufficient decrease of the oil pressure PC1 so that the neutral control can be effectively performed. Meantime, the engagement force for engaging the first friction brake B1 is sufficiently increased in response to the sufficient increase of the oil pressure PB1 so that the hill hold control can be effectively performed.

While the neutral and hill hold control have been performed, the program proceeds to step 109 so as to judge whether or not any one of the driving ranges has been established in the transmission 10, i.e. whether or not the vehicle is moving in the rearward direction, whether or not the vehicle is parked, or whether or not the manual shift lever has been operated so as to establish the neutral condition in the transmission 10. When the ECU 400 judges at step 109 that any one of the driving ranges has been established in the transmission 10, the program proceeds to step 110 so as to judge whether or not the vehicle is moving from a stopped condition. More particularly, the ECU 400 judges based upon the signal from the brake sensor 46 whether or not the brake pedal 52 was released from being operated. The program then proceeds to step 111 when the brake pedal 52 has not been operated any more, wherein the neutral and hill hold controls are terminated and a driving condition return control is performed. The program then proceeds to step 112 so as to shift the shift pattern from the shift pattern 1 to the shift pattern 2 by electrically exciting the ON-OFF solenoid valve 220 so that the line pressure can be supplied to the first friction clutch C1. As described above, the neutral control and the hill hold control are terminated.

As described above, according to the embodiments of the present invention, the hill hold control is performed after establishing the neutral condition in the automatic transmission 10. Alternatively, the hill hold control can be performed prior to establishing the neutral condition in the automatic transmission 10. In this case, the oil pressure PB1 supplied to the first friction brake B1 is sufficiently increased for performing the hill hold control and then the oil pressure PC1 supplied to the first friction clutch C1 is sufficiently decreased for performing the neutral control.

Figure 4:
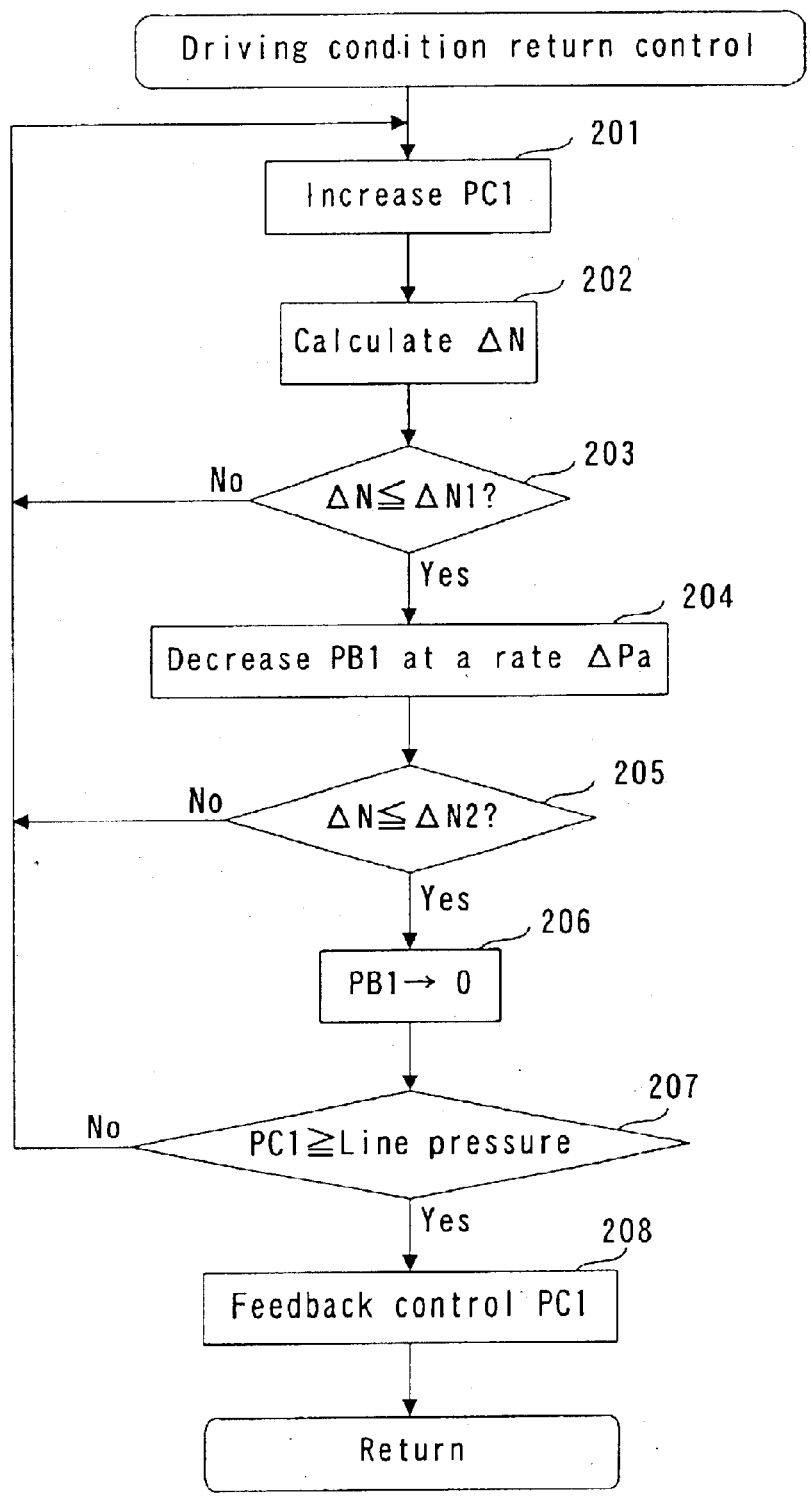
FIG. 4 is a flow chart for explaining a control for returning to a driving condition performed at step 111 in the flow chart of FIG. 3 according to the first embodiment of the present invention.

Next, the driving condition return control according to the first embodiment of the present invention performed at step 111 in FIG. 3 is described in more details hereinbelow with reference to the flow chart illustrated in FIG. 4 and the time chart illustrated in FIG. 5. When the driving condition return control is performed, the program proceeds to step 201 (an engagement force increasing means) so as to increase the oil pressure PC1 at the constant rate at time t1 in FIG. 5 by controlling the electrically exciting operation for the linear solenoid valve 80. Then engagement force for engaging the first friction clutch C1 is increased corresponding to the increase of the oil pressure PC1 so that the turbine wheel 21 is again connected to the forward movement member 13 and the rotational speed of the turbine wheel 21 is gradually approximated with the rotational speed of the forward movement member 13. At step 202 (a relative rotational speed calculating means), the ECU 400 calculates a relative rotational speed $\Delta N$ between each rotational speed of the turbine wheel 21 and the forward movement member 13 based upon the signals from the input shaft rotational speed sensor 42 and the forward movement member rotational speed sensor 47. The program then proceeds to step 203 (a second comparing means) for judging whether or not the calculated relative rotational speed $\Delta N$ is substantially equal to or smaller than an intermediate rotational speed $\Delta N1$. When the relative rotational speed $\Delta N$ is judged to be greater than the intermediate rotational speed $\Delta N1$, the program returns to step 201, wherein the oil pressure PC1 is increased at the constant rate so as to control the relative rotational speed $\Delta N$ to be substantially equal to or smaller than the intermediate rotational speed $\Delta N1$. Hereinafter, the intermediate rotational speed $\Delta N1$ is predetermined to be closer to a relative rotational speed under the neutral condition rather than to an intermediate rotational speed between the relative rotational speed under the neutral condition and a relative rotational speed for establishing the first shift stage. When the relative rotational speed $\Delta N$ is judged to be substantially equal to or smaller than the intermediate rotational speed $\Delta N1$ at a time 2 in FIG. 5, the program proceeds to step 204 (a second engagement force decreasing means) so as to decrease the oil pressure PB1 supplied to the first friction brake B1 at a predetermined rate $\Delta Pa$ by controlling an electrically exciting operation for the linear solenoid valve 60.

As described above, the engagement force for engaging the first friction brake B1 is decreased at step 204 after the rotation of the forward movement member 13 was actually detected to have concurred with the rotation of the turbine wheel 21 at step 203. The program then proceeds to step 205 (a first comparing means) for judging whether or not the relative rotational speed $\Delta N$ is substantially equal to or smaller than a predetermined rotational speed $\Delta N2$. When the relative rotational speed $\Delta N$ is judged to be greater than the predetermined rotational speed $\Delta N2$ at step 205, the program returns to step 201 so as to increase the oil pressure PC1 again at a the constant rate so as to control the relative rotational speed $\Delta N2$ is set to be closer to the rotational speed for establishing the first shift stage rather than to the intermediate rotational speed between the relative rotational speed under the neutral condition and the relative rotational speed for establishing the first shift stage. When the relative rotational speed for establishing the first shift stage. When the relative rotational speed $\Delta N$ is judged to be substantially equal to or smaller than the predetermined rotational speed $\Delta N2$ at a time t3 illustrated in FIG. 5, the program proceeds to step 206 (a first engagement force decreasing means) so as to rapidly decrease the oil pressure PB1 to be zero by controlling the electrically exciting operation for the linear solenoid valve 60.

As described above, when the oil pressure PB1 is controlled at step 206, the engagement force for engaging the first friction clutch C1 has been already ensured in the transmission 10 and the engagement force for engaging the first friction brake B1 has been still left. In this case, the transmission 10 has been already released from the neutral condition and yet has not achieved the first shift stage therein. The output shaft 12 has been rotated being applied with a holding force which is substantially smaller than a holding force upon the hill hold control. The program then proceeds to step 207 so as to judge whether or not the oil pressure PC1 is substantially equal to or greater than the line pressure. When the ECU 400 judges that the oil pressure PC1 is substantially equal to or greater than the line pressure at step 207, the program proceeds to step 208 so as to feedback control the oil pressure PC1 at a time t4 illustrated in FIG. 5 for maintaining the oil pressure PC1 to be substantially equal to or greater than the line pressure. The program then proceeds to step 112 illustrated in the flow chart in FIG. 3 and the neutral and hill hold controls are terminated and the first shift stage is established in the automatic transmission 10.

According to an aspect of the first embodiment of the present invention, the engagement force of the first friction brake B1 is decreased after verifying that the turbine wheel 21 has been connected to the forward movement member 13. Therefore, the engagement force of the first friction brake B1 can be decreased based upon the actually engaged condition of the first friction clutch C1 and not due to dimensional fluctuations of the friction clutch C1 and the friction brake B1. Accordingly the hill hold condition in the transmission 10 can be prevented from being released during the neutral control when the vehicle is leaving from the stopped condition, thereby the vehicle start feeling can be effectively improved.

According to another aspect of the first embodiment of the present invention, the holding force for preventing the output shaft 12 of the automatic transmission 10 is approximately varied in proportion with the engagement force for engaging the second friction brake B1. The engagement force for engaging the second friction engagement element can not be decreased immediately after releasing the brake pedal 52 from the operated condition until the relative rotational speed reaches the intermediate rotational speed, thereby the holding force approximately corresponds to the holding force under the vehicle stationary condition. The oil pressure PB1 is decreased at the predetermined ratio $\Delta Pa$, which is relatively gradual, while the relative rotational speed $\Delta N$ is within a range between the intermediate rotational speed N1 and the predetermined rotational speed N2 from the t2 to the time t3, thereby the engagement force for engaging the first friction brake B1 is gradually decreased. Therefore, the hill hold condition established by the one-way clutch F1 and the first friction brake B1 is gradually released. In this case, the holding force is controlled not to become zero before the brake pedal 52 is released from the operated condition and the shift operation of the friction engagement elements to be engaged in the automatic transmission 10 can be smoothly performed when the vehicle is leaving from the stopped condition.

A method for controlling the automatic transmission 10 according to a second embodiment of the present invention is different from the controlling method according to the first embodiment in the respect of the driving condition return control at step 111 illustrated in FIG. 3. Therefore, the identical reference numerals are used for describing the second embodiment and the description will be omitted for simplifying the description of the second embodiment.

When the driving condition return control according to the second embodiment is performed, the program proceeds to step 301 so as to increase the oil pressure PC1 at the constant rate by controlling the electrically exciting operation for the linear solenoid valve 80. The turbine wheel 21 is connected to the forward movement member 13 corresponding to the increase of the engagement force for engaging the first friction clutch C1, thereby the rotational speed of the turbine wheel 21 is gradually approximated with the rotational speed of the forward movement member 13. The program then proceeds to step 302 to calculate a relative rotational speed $\Delta N(n)$ between each rotational speed of the turbine wheel 21 and the forward movement member 13 based upon the signals from the input shaft rotational speed sensor 42 and the forward movement member rotational speed sensor 47. The term "n" of the relative rotational speed $\Delta N(n)$ represents the number of times to calculate the relative rotational speed $\Delta N$ at step 302 since the driving condition return control was performed. Therefore, the term "n" can be "1" when the relative rotational speed $\Delta N$ is first calculated since the driving condition return control was performed and can be "2" when the relative rotational speed $\Delta N$ is secondly calculated. The term "n" represents a positive counting number under the driving condition return control and is reset to be zero when the driving condition return control is terminated.

The program then proceeds to step 303 for judging whether or not the calculated relative rotational speed $\Delta N(n)$ is substantially equal to or smaller than the intermediate rotational speed $\Delta N1$. When the ECU 400 judges at step 303 that the relative rotational speed $\Delta N(n)$ is greater than the intermediate rotational speed $\Delta N1$, the program returns to step 301 and increase the oil pressure PC1 at the constant rate so as to control the relative rotational speed $\Delta N(n)$ to be substantially equal to or smaller than the intermediate rotational speed $\Delta N1$. On the other hand, when the ECU 400 judges at step 303 that the relative rotational speed $\Delta N(n)$ is substantially equal to or smaller than the intermediate rotational speed $\Delta N1$, the program proceeds to step 304 so as to judge whether or not the term "n" represents a number which is greater than "1". That is, at step 304 (a judging means), the ECU 400 judges whether or not the relative rotational speed $\Delta N(n)$ at this time is calculated for the first time. When the term "n" represents the number which is equal to or smaller than "1" at step 304, the program proceeds to step 308 and the oil pressure PB1 to be supplied to the first friction brake B1 is decreased at the predetermined rate $\Delta Pa$ by controlling the electrically exciting operation for the linear solenoid valve 60.

On the other hand, when the ECU 400 judges that the term "n" represents a number which is greater than "1" at step 304, the program proceeds to step 305 (a relative rotational speed variation calculating means) so as to calculate how much the relative rotational speed $\Delta N(n)$ calculated at this time was decreased from the relative rotational speed $\Delta N(n-1)$ calculated last time. More particularly, the ECU 400 judges at step 305 how much the engagement force for engaging the first friction clutch C1 was increased corresponding to the increase of the oil pressure PC1 at step 301, i.e. the ECU 400 judges a variation of the relative rotational speed $\Delta N$. The program then proceeds to step 306 (a first rate determining means) after calculating the variation in accordance with a following formula: $\Delta N(n-1)-\Delta N(n)$. At step 306, a ratio $\Delta Pa(n)$ corresponding to the calculated difference is determined as a first rate $\Delta Pa(n)$ with reference to a map (not shown). The program further proceeds to step 307 (a third engagement force decreasing means) so as to decrease the oil pressure PB1 at the first rate $\Delta Pa(n)$. When the oil pressure PB1 is decreased at step 307, the program proceeds to step 309 so as to judge whether or not the relative rotational speed $\Delta N(n)$ is substantially equal to or smaller than the predetermined rotational speed $\Delta N2$. When the relative rotational speed $\Delta N2$, the program returns to step 301 and the oil pressure PC1 is increased at the constant rate so as to control the relative rotational speed $\Delta N(n)$ to be substantially equal to or smaller than the predetermined rotational speed $\Delta N2$. On the other hand, when the ECU 400 judges at step 309 that the relative rotational speed $\Delta N(n)$ is substantially equal to or smaller than the predetermined rotational speed $\Delta N2$, the program proceeds to step 310 and the oil pressure PB1 is rapidly decreased so as to become zero by controlling the electrically exciting cooperation for the linear solenoid valve 60. Hereinafter the intermediate rotational speed N1 and the predetermined rotational speed N2 according to the second embodiment are identical to the ones according to the first embodiment.

As described above, when the oil pressure PB1 is controlled at step 310, the engagement force for engaging the first friction clutch C1 has been already ensured in the transmission 10 and the engagement force for engaging the first friction brake B1 has been still left. The program then proceeds to step 311 so as to judge whether or not the oil pressure PC1 is substantially equal to or greater than the line pressure. When the ECU 400 judges that the oil pressure PC1 is substantially equal to or greater than the line pressure at step 311, the program proceeds to step 312 so as to feedback control the oil pressure PC1 for maintaining the oil pressure PC1 to be substantially equal to or greater than the line pressure. The program then proceeds to step 112 illustrated in the flow chart in FIG. 3 and the neutral and hill hold controls are terminated and the first shift stage is established in the automatic transmission 10.

According to the second embodiment of the present invention, as described above, the first rate $\Delta Pa(n)$ is varied in response to the variation of the relative rotational speed $\Delta N(n)$. Therefore, when the oil pressure PC1 is rapidly increased at step 301 or is gradually increased, the oil pressure PB1 is decreased at an appropriate rate in response to the increase of the oil pressure PC1, i.e. in response to the increase of the engagement force for engaging the first friction clutch C1, wherein the hill hold condition is released following the shift operation of the transmission 10 from the neutral condition to the predetermined shift stage. In this case, the automatic transmission 10 can be controlled relative to disturbance such as dimensional fluctuation.

The principles, preferred embodiments are made of operation of the present invention have been described in the foregoing specification. However, the invention which is intended to be protected is not to be construed as limited to the particular embodiments disclosed. Further, the embodiments described herein are to be regarded as illustrative

What we claim is:

1. A control apparatus for controlling an automatic transmission for a vehicle comprising:
   an automatic transmission capable of switching plural shift stages;
   a torque converter for controlling transmitting rotation of an engine to the automatic transmission via a fluid;
   a first friction engagement element for connecting a turbine wheel housed in the torque converter and a forward movement member housed in the automatic transmission when the first friction engagement element is engaged;
   a one-way clutch housed in the automatic transmission to establish a predetermined shift stage in the automatic transmission cooperating with the first friction engagement element; and
   a second friction engagement element housed in the automatic transmission to prevent an output shaft of the automatic transmission from being rotated in a reverse direction cooperating with the one-way clutch when the second friction engagement element is engaged,
   wherein an engagement force for engaging the first friction engagement element is set to be lower than an engagement force for establishing the predetermined shift stage with the second friction engagement element being engaged when a vehicle is under a stationary condition with an acceleration operating member not being operated and a brake operating member being operated under a forward driving range being established in the automatic transmission, the engagement force for engaging the first friction engagement element is increased when the vehicle starts from the stationary condition with the brake operating member released from the operated condition, and the engagement force for engaging the second friction engagement element is decreased when a relative rotational speed between the turbine wheel and the forward movement member becomes equal to or smaller than a predetermined rotational speed, thereby the predetermined shift stage is established in the automatic transmission; and
   wherein the engagement force for engaging the second friction engagement element is decreased at a predetermined rate when the relative rotational speed becomes equal to or smaller than an intermediate rotational speed which is greater than the predetermined rotational speed in response to the vehicle start from the stationary condition with the brake operating member released from the operated condition, and the engaging force for engaging the second friction engagement element is further decreased faster than the predetermined rate when the relative rotational speed becomes equal to or smaller than the predetermined rotational speed.

2. A control apparatus for an automatic transmission according to claim 1, wherein the predetermined rate is varied so as to decrease the engagement force for engaging the second friction engagement element corresponding to a variation of the relative rotational speed when the relative rotational speed is within a range between the intermediate rotational speed and the predetermined rotational speed.

3. A control apparatus for an automatic transmission according to claim 1, wherein the torque converter is disconnected from the automatic transmission in response to the decrease of the engagement force for engaging the first friction engagement element and the second friction engagement element is engaged.

4. A control apparatus for an automatic transmission according to claim 1, wherein the engagement force for engaging the first friction engagement element is increased at a constant rate so as to control the relative rotational speed to become equal to or smaller than the intermediate rotational speed or the predetermined rotational speed and the second friction engagement element is decreased.

5. A control apparatus for an automatic transmission according to claim 2, the engagement force for engaging the first friction engagement element is increased at a constant rate so as to control the relative rotational speed to become equal to or smaller than the intermediate rotational speed or the predetermined rotational speed and the second friction engagement element is decreased.

6. A control apparatus for an automatic transmission according to claim 1, wherein the intermediate rotational speed is smaller than a relative rotational speed under a neutral condition in the automatic transmission.

7. A control apparatus for an automatic transmission according to claim 2, wherein the intermediate rotational speed is smaller than a relative rotational speed under a neutral condition in the automatic transmission.

8. A method for controlling an automatic transmission comprising:
   increasing an engagement force for engaging a first friction engagement element when a vehicle starts from a stationary condition with a brake operating member released from being operated under a forward driving range in an automatic transmission;
   calculating a relative rotational speed between a turbine wheel an a forward movement member;
   comparing the relative rotational speed with a predetermined rotational speed;
   decreasing an engagement force for engaging a second friction engagement element when the relative rotational speed is equal to or smaller than the predetermined rotational speed,
   comparing the relative rotational speed with an intermediate rotational speed greater than the predetermined rotational speed;
   decreasing the engagement force for engaging the second friction engagement element at a predetermined rate when the relative rotational speed is equal to or smaller than the intermediate rotational speed, wherein the engagement force for engaging the second friction engagement element is decrease faster than the predetermined rate when the relative rotational speed is equal to or smaller than the predetermined rotational speed; and
   substantially terminating a neutral control in the automatic transmission prior to performing a hill hold control.

9. A method for controlling an automatic transmission according to claim 8, further comprising:
   judging how many times the relative rotational speed was counted after the vehicle started from the stationary condition with the brake operating member released from the operated condition under the forward driving range in the automatic transmission;
   calculating how much the relative rotational speed was decreased when the relative rotational speed is judged to have been counted before;

determining a first rate for decreasing the engagement force for engaging the second friction engagement element corresponding to the variation of the relative rotational speed; and decreasing the engagement force for the second friction engagement element at the first rate when the relative rotational speed is within a range between the intermediate rotational speed and the predetermined rotational speed.

10. A method for controlling an automatic transmission according to claim 9, the engagement force for engaging the second friction engagement element is decreased at the predetermined rate when the relative rotational speed is judged to be first counted.

11. A method for controlling an automatic transmission according to claim 8, wherein the engagement force for engaging the first friction engagement element is increased at a constant rate to control the relative rotational speed to become equal to or smaller than the intermediate rotational speed or the predetermined rotational speed and the second friction engagement element is decreased.

12. A method for controlling an automatic transmission according to claim 9, wherein the engagement force for engaging the first friction engagement element is increased at a constant rate to control the relative rotational speed to become equal to or smaller than the intermediate rotational speed or the predetermined rotational speed and the second friction engagement element is decreased.

13. A method for controlling an automatic transmission according to claim 10, wherein the engagement force for engaging the first friction engagement element is increased at a constant rate to control the relative rotational speed to become equal to or smaller than the intermediate rotational speed or the predetermined rotational speed and the second friction engagement element is decreased.

14. A method for controlling an automatic transmission according to claim 8, wherein the intermediate rotational speed is smaller than a relative rotational speed under a neutral condition in the automatic transmission.

15. A method for controlling an automatic transmission according to claim 9, wherein the intermediate rotational speed is smaller than a relative rotational speed under a neutral condition in the automatic transmission.

* * * * *